United States Patent Office 3,251,250
Patented May 17, 1966

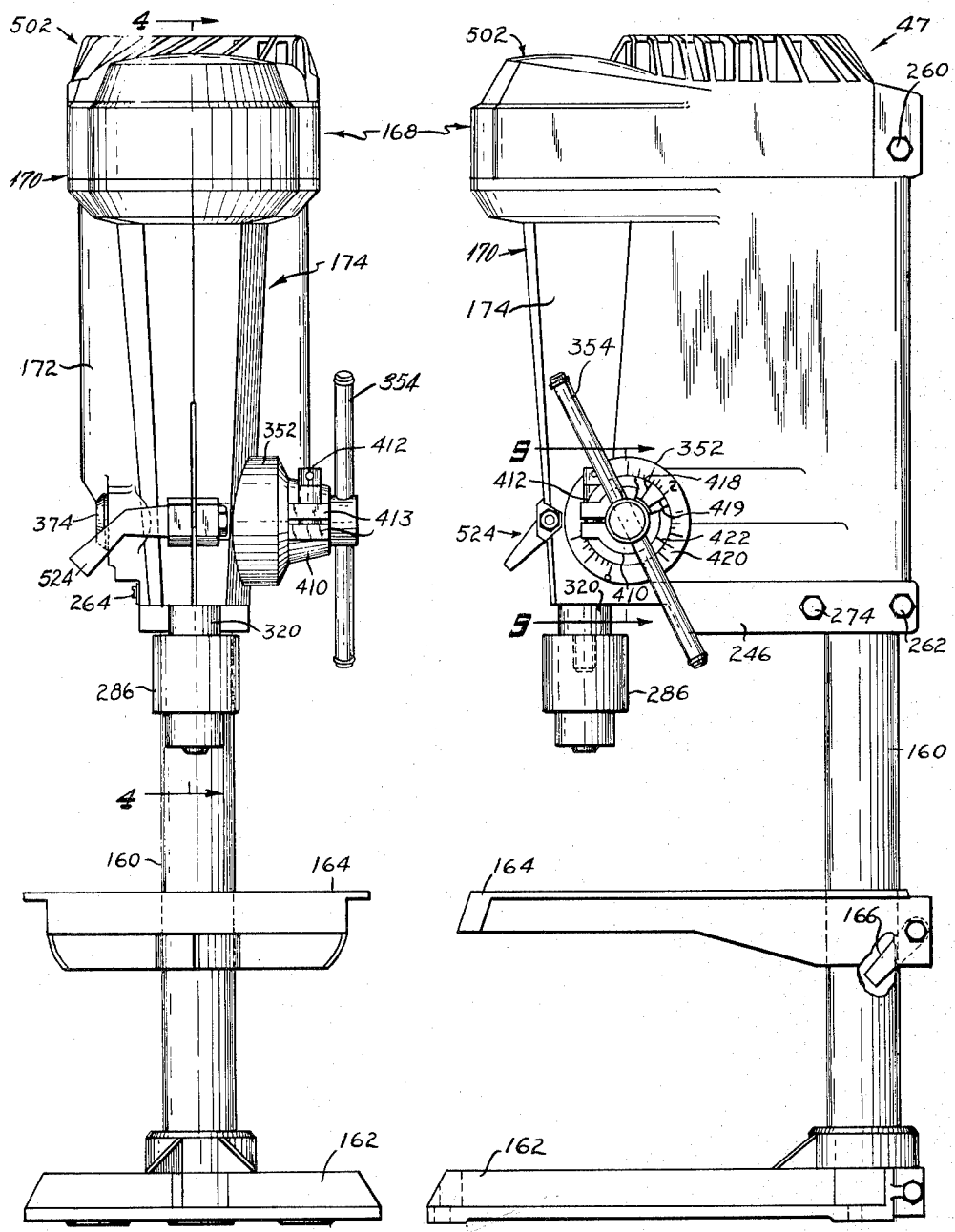

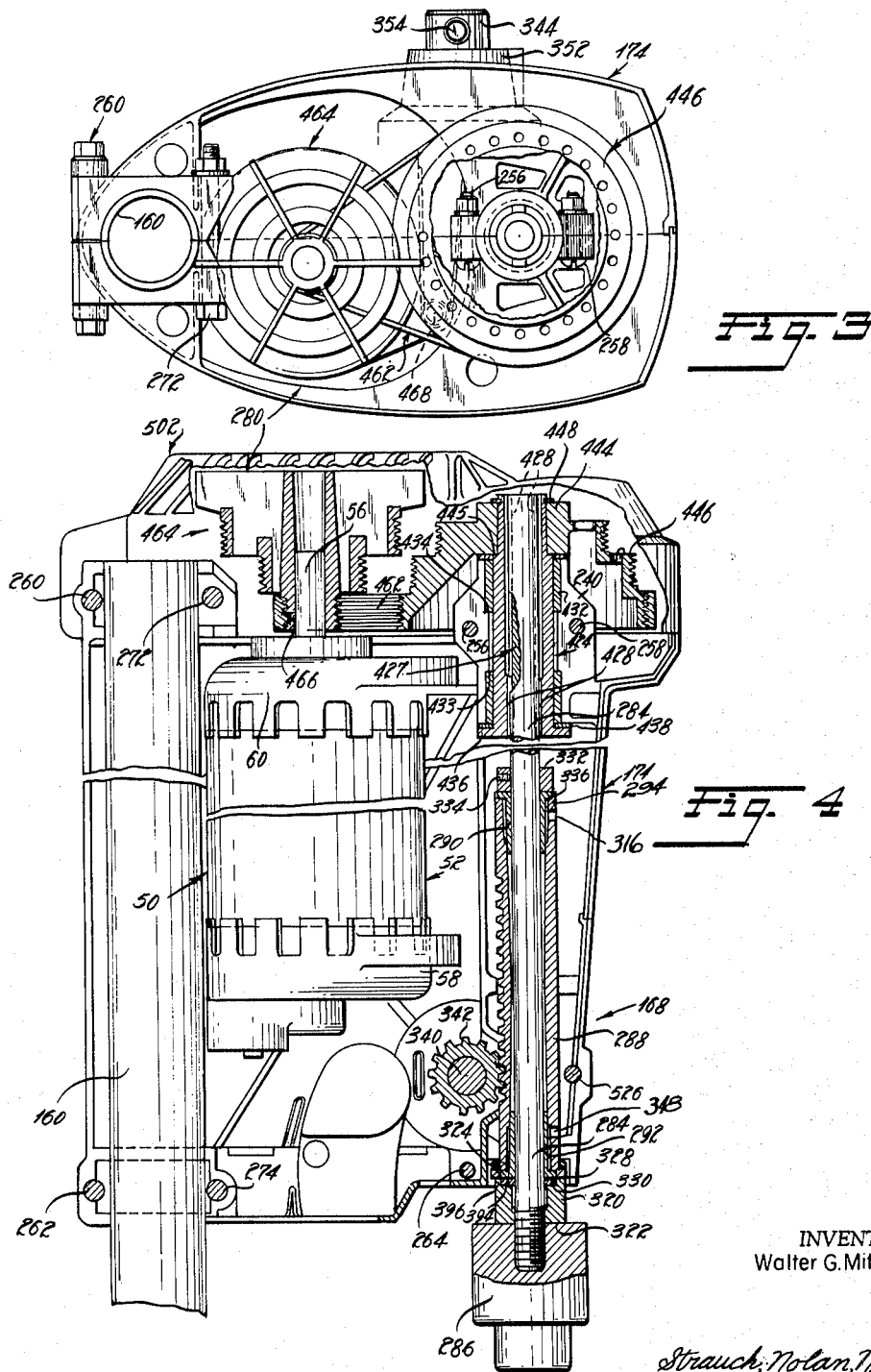

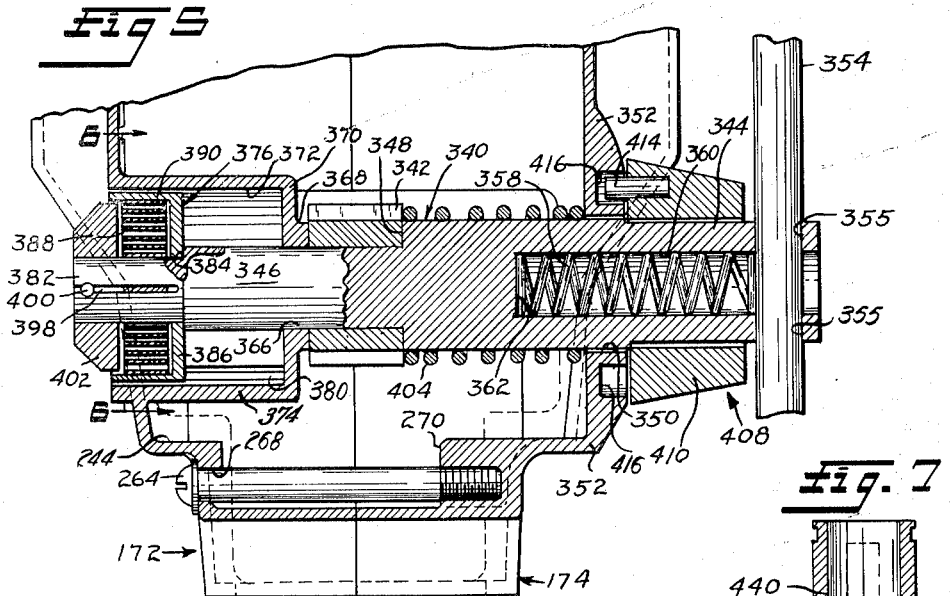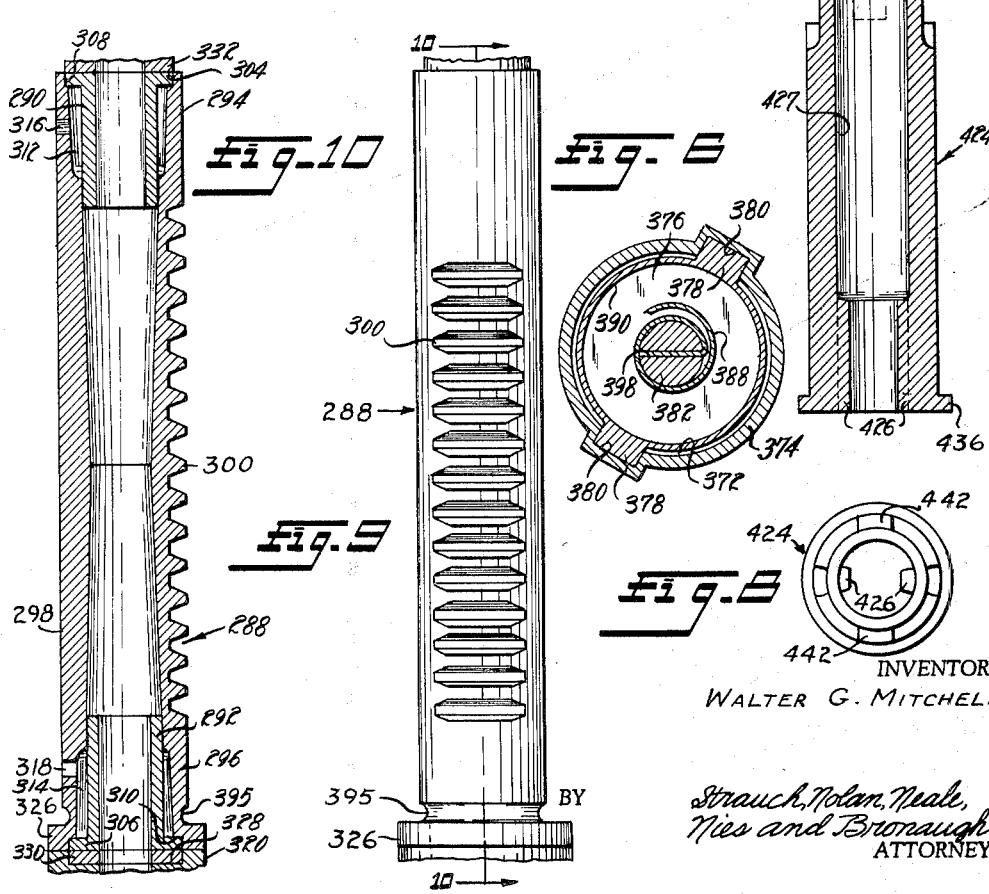

3,251,250
POWER TOOL IMPROVEMENTS
Walter G. Mitchell, Pitcairn, Pa., assignor to Rockwell Manufacturing Company, Pittsburgh, Pa., a corporation of Pennsylvania
Original application Oct. 31, 1961, Ser. No. 149,002. Divided and this application Apr. 6, 1965, Ser. No. 451,088
5 Claims. (Cl. 77—34.5)

This is a division of copending application Serial No. 149,002 filed October 31, 1961, for Power Tool Improvements.

The present invention relates to power tool improvements and more particularly to improvements in bench or table supported power tools which make it possible to reduce the size and weight of such power tools and their parts with incident simplification of the over-all construction of such tools and marked savings in materials and manufacturing expense while at the same time assuring at least the same or greater work handling capacity of the larger and heavier power tools now generally offered on the market.

A major object of the present invention is to provide a drill press quill feed mechanism of the spring return type that is simple and inexpensive to manufacture yet designed to permit ready adjustment of the return spring tension without any need to release any part of the return spring mechanism from its enclosing housing or handling of parts that are difficult to grasp and might, therefore, injure the operator.

A further object of the present invention is to provide in combination with other elements of a drill press quill feed mechanism having an exposed feed shaft portion with a simple depth of cut stop and indicator that may be set at any desired portion of the feed stroke to directly accurately determine through scale indications a desired depth of penetration of a workpiece.

Further objects will appear from the following description and appended claims when read in conjunction with the accompanying drawings wherein:

FIGURE 1 is a front elevation of the drill press of this invention;

FIGURE 2 is a side elevation of the drill press shown in FIGURE 1;

FIGURE 3 is a top plan view of the drill press shown in FIGURE 1 with the top cover plate removed;

FIGURE 4 is a vertical section through the drill press of FIGURE 1 taken substantially along lines 4—4 thereof;

FIGURE 5 is a fragmentary section taken substantially along lines 5—5 of FIGURE 2;

FIGURE 6 is a fragmentary section taken substantially along lines 6—6 of FIGURE 5;

FIGURE 7 is a diametrical longitudinal section through the drive shaft of FIGURE 1;

FIGURE 8 is a top plan view of the drive shaft shown in FIGURE 7;

FIGURE 9 is a fragmentary view illustrating an enlarged elevation of the quill and spindle assembly shown in FIGURE 1 and looking into the peripheral face containing the rack teeth; and FIGURE 10 is a section taken substantially along lines 10—10 of FIGURE 9.

Referring now to the drawings and more particularly to FIGURES 1-4, the drill press 47 incorporating the principles of this invention is of the motor powered, bench type and is adaptable for selective hand or portable usage as explained in detail in the aforesaid copending application Serial No. 149,002. Drill press 47 comprises a rigid upright tubular column 160 fixedly mounted at its lower end on a bench-type base 162 of conventional form. A conventional work supporting table 164 adjustably mounted on column 160 is clamped in a selected fixed position along column 160 by means of a manually manipulatable clamping lever 166 in the usual manner.

Mounted on the upper end of support column 160 vertically above table 164 is a drill head assembly which is generally indicated by the reference characters 168 and which includes a novel elongated two piece motor and operating mechanism housing 170. Housing 170 is longitudinally split into two hollowed mating thin walled housing halves 172 and 174 as best shown in FIGURES 1, 2 and 4. Housing halves 172 and 174 of the present invention each are formed with a configuration approximately corresponding to a clam shell with each of the halves being formed as integral die cast structures of lightweight high heat conductive metal. Housing halves 172 and 174 are preferably die cast from aluminum or they may be cast from an aluminum alloy. Reference is made to the aforesaid copending application Serial No. 149,002 in the event that further details of housing 170 is desired. Mounted in housing 170 is a motor 50 comprising a stator 52 surrounding an unshown rotor which is non-rotatably mounted on a drive shaft 56. Shaft 56 is rotatably supported in end bells 58 and 60 spaced axially apart at opposite ends of the unshown rotor. For further details of motor 50 reference is made to the aforesaid copending application Serial No. 149,002.

As described in detail in the aforesaid copending application Serial No. 149,002, housing halves 172 and 174 are securely clamped together on column 160 by nut and bolt assemblies 256, 258, 260, 262, 272, and 274 and by a machine screw 264.

With continuing reference to FIGURES 1-4, drill head assembly 168 includes an operating mechanism 280 which comprises a drill spindle 284 received in housing 170 and having its chuck end extending beyond housing 170 and carrying, at its lower end, a chuck 286 within which a drill (not shown), or other tool is held for working engagement with the work material (not shown) mounted on work supporting table 164.

Spindle 284 coaxially extends through a rigid axially reciprocable tubular quill 288 and is journalled in quill 288 on longitudinally spaced apart sleeve bearings 290 and 292 which are preferably made of sintered bronze. Quill 288 is formed as a one-piece die cast structure of a lightweight high heat conductive metal which is preferably aluminum.

As best shown in FIGURES 4, 9, and 10, quill 288 is formed with oppositely facing recessed lubricant-well end portions 294 and 296 integrally joined by an intermediate body portion 298 having a reduced internal diameter and a longitudinal rack 300.

Sleeve bearings 290 and 292 are respectively extended into body portion 298 with a press fit and are respectively provided with radially outwardly extending flange portions 304 and 306 snugly seated on annular recessed shoulders 308 and 310 formed inwardly of opposite end faces of quill 288.

As best shown in FIGURE 4 sleeve bearings 290 and 292 respectively from with end portions 294 and 296 annular lubricant chambers 312 and 314 which are filled with suitable lubricant through radially extending lubricant holes 316 and 318 formed in quill 288.

With continued reference to FIGURES 4, 9, and 10, a bearing mounting collar 320 is fixedly secured to the lower end of spindle 284 axially between chuck 286 and quill 288 and is formed with flat oppositely directed end faces 322 and 324 respectively abutting correspondingly flat surfaces of chuck 286 and a radially extending end flange portion 326 formed integral with quill 288. Collar 320 is provided with a recessed annular shoulder 328 axially inwardly of end face 324 on which is seated a thrust bearing 330 abuttingly engaging sleeve bearing flange 306.

Adjacent the upper end of quill 288, a collar 332 fixedly secured to spindle 284 by means of a set screw 334, is provided with a flat end face 336 abuttingly engaging sleeve bearing flange 304. By the foregoing quill and spindle mounting structure, it is clear that spindle 284 is journalled in quill 288 and is axially retained on quill 288 by collars 320 and 332.

Referring now to FIGURES 1–4 and 5, quill 288 is longitudinally advanced and retracted by means of a one-piece feed shaft 340 having a pinion 342 fixedly secured thereto as by brazing and meshing with rack 300. Feed shaft 340 is provided with an enlarged diametered handle section 344 and a reduced diametered section 346 forming with section 344 a radially extending annular shoulder 348 snugly abutting pinion 342.

Shaft section 346 is journalled in and extends through a bore 350 formed through a boss 352 which is integral with housing half 174 and which projects outwardly from the exterior surface of the housing along an axis extending normal to the axis of spindle 284 and column 160. A rod-shaped feed handle 354 extends through diametrically opposed radially extending bores 355 in the outer end of feed shaft section 344 extending beyond boss 352, and is manually manipulatable to selectively rotate shaft 340 in the usual manner.

As best shown in FIGURE 5, feed handle 354 is retained in place on feed shaft 340 by means of a coil spring 358 received in a blind bore 360 formed inwardly of the outer end of feed shaft section 344 coaxially with the rotational axis of shaft 340 and in intersecting relationship with bores 355. Spring reacts against a bottom end wall 362 in shaft bore 360 to biasingly engage the intermediate portion of feed handle 354 extending transversely through bore 360, thereby urging handle 354 into frictional retaining engagement with the smooth cylindrical wall surfaces of shaft bores 355.

With continued reference to FIGURE 5, feed shaft section extends through and is journalled in a bore 366 formed in a boss portion 368 and coaxially aligning with bore 350. Boss portion 368 is integral with housing half 172 and projects inwardly from an upstanding end wall segment 370 of an outwardly opening axially elongated quill return spring recess 372 formed in housing half 172. Boss 368 has a flat end face extending normal to the rotational axis of shaft 340 and the matingly abutting the opposing end face of pinion 342 when the latter is in meshing engagement with rack 300.

As shown, recess 372 is formed by an outwardly directed annular socket portion 374 which is integral with housing half 172.

With reference to FIGURES 5 and 6 a generally cylindrical hollow quill return spring casing 376 is axially received in recess 372 in interfitting sliding engagement therewith. Casing 376 is provided with diametrically opposing radially outwardly projecting tongue formations 378 on its outer wall which are matingly received in diametrically opposed axially directed groove formations 380 formed in the socket wall portion 374 of recess 372. By this structure casing 376 is permitted to slide axially in recess 372 but is retained against rotation relative to housing 170.

As best shown in FIGURE 5, feed shaft section 346, which is of smaller diameter than section 344, extends axially into recess 372 and terminates in a reduced diametered end section 382 which projects outwardly beyond recess 372 when pinion is in meshing engagement with rack 300 and which forms with shaft section 346 a radially extending outwardly directed annular shoulder 384. As shown, shaft section 382 extends freely through a flat sided end wall portion 386 of casing 376 to permit shaft 340 to rotate relative to casing 376. Wall portion 386 is immediately adjacent to shoulder 384 as shown. A clock type spiral spring 388 received in casing 376 is mounted in surrounding relationship to shaft section 382 and has its inner end fixed to shaft section 382 in a manner as will be described and its outer end fixedly secured to an annular wall 390 of casing 376 in any suitable manner.

By means of the foregoing spring and casing construction, feed shaft 340 is biased by spring 388 to urge quill 288 upwardly in a tool retracting direction through the meshing engagement of pinion 342 with quill rack 300. Thus, by rotation of feed shaft 340 in a clockwise direction (as viewed from FIGURE 4) to advance quill 288 and spindle 284 in a tool feeding direction, spring 388 is energized, and when feed handle 354 is released by the operator, the energy stored in spring 388 axially retracts quill 288 and spindle 284 to the positions shown in the drawings.

As shown in FIGURE 4, a bumper-type O-ring 394 of suitable resilient shock absorbing material is seated in a peripheral groove 395 formed in quill 288 immediately adjacent to and inwardly of the quill flange portion 326 as shown in the drawings, the outwardly directed end of quill 288 having flange portion 326 is received in an outwardly directed well 396 formed by housing halves 172 and 174 when quill 288 is returned to its fully retracted position shown in the drawings. In this position, O-ring 394 is compressed under the bias of spring 388 between quill flange portion 326 and the respective collar portions 205 of housing halves 172 and 174 to absorb any shock resulting from a rapid return of quill 288 to its fully retracted position.

With continued reference to FIGURES 5 and 6, feed shaft section 382 is provided with a dimetrical slot 398 which extends inwardly from the outwardly directed end and receives the inner end of spring 388. Received in mating arcuate surfaces of slot 398 near its outer end is a diametrical pin 400 which extends beyond the periphery of shaft section 382 for fixedly mounting a retaining ring 402 thereon axially outwardly of spring 388.

Ring 402 is axially engageable with spring 388 in casing 376 to hold the spring against relative axial movement with respect to shaft section 382.

With the foregoing quill feed construction, it will be appreciated that shaft 340 is selectively axially shiftable from the position shown in the drawings to a position where it is partially withdrawn from housing 170 and where pinion 342 is completely disengaged from rack 300 and shifted to one side thereof. When pinion 342 engages rack 300 in the position of component parts illustrated in the drawings, casing 376 is disposed adjacent the outer end of recess 372 and ring 402 is disposed substantially beyond the recess. A coil spring 404 surrounding shaft section 344 biasingly engages the right-hand end face of pinion 342 (as viewed from FIGURE 5). Spring 404 reacts against housing half 174 to bias shaft 340 together with pinion 342, casing 376, spring 388 and ring 402 to the positions shown in the drawings where pinion 342 engages rack 300.

To withdraw feed shaft 340 in order to disengage pinion 342 from rack 300, the operator grips feed handle 354 and pulls it away from housing 170 thus shifting shaft 340 outwardly against the bias of spring 404. As feed shaft 340 is shifted axially to the right, as viewed from FIGURE 5, ring 402 abuttingly engages spring 388 to axially shift spring 388 and casing 376 inwardly toward end wall segment 370 of recess 372.

Recess 372 has a sufficient length to assure complete disengagement of pinion 342 from rack 300 before casing end wall 386 is shifted into abutment with wall segment 370 of recess 372. The axial length of feed shaft section 346 extending from the left-hand end face of pinion 342, as viewed from FIGURE 5, to shoulder 384 is sufficient to assure that casing 376 with spring 388 is located at the outer end of recess 372 when pinion 342 butts against end wall segment 370 of recess 372. In the position of parts shown, it is clear that boss 368 limits the axial displacement of pinion 342 together with feed shaft 340 under the bias of spring 404 to assure that pinion 340 aligns with quill 288 with the teeth of pinion 340 in full meshing engagement with quill rack 300 when shaft 340 is axially released to ride inwardly to the position illustrated.

Thus, with the foregoing structure enabling pinion 342 to be disengaged from rack 300 by axially withdrawing feed shaft 340, the tension of spring 388 may be selectively varied for adjusting the rate of spindle and quill assembly return to accommodate the weight of various tools employed in the workshop.

As shown in FIGURES 1, 2 and 5, a depth of cut gauge 408 comprises a split stop collar 410 relatively rotatably carried by feed shaft section 346 axially between feed handle 354 and housing 170. A collar screw 412 extending through mating ears 413 on collar 410 enables collar 410 to be fixed in a selected relative angular position on feed shaft 340. Fixed to collar 410 and extending axially inwardly therefrom in spaced apart parallel relation to the axis of shaft 340 is a stop pin 414 which projects into an outwardly opening arcuate groove 416 formed in boss portion 352. Groove 416 is coaxially related to the rotational axis of feed shaft 340 and has an angular length which is less than 360° to form, on boss 352 peripherally oppositely facing spaced apart stop surfaces indicated by the reference characters 418 and 419. A graduated depth of cut scale indicated at 420 provided for an outwardly directed surface of boss 352 cooperates with an index 422 on collar 410. Index 422 and stop pin 414 are so angularly arranged that when pin 414 abuts surface 419 index 422 will align with the depth of cut graduation marked zero.

In order to establish a selected depth of cut with the foregoing depth gauge construction, quill 288 is advanced to a position where the tool (not shown) in chuck 286 touches the work material. With feed shaft 340 held stationary at this advanced position, collar 410 then is rotated relative to shaft 340 to the graduation on scale 420 designating the desired depth of cut to be made. Screw 412 then is tightened to fix collar 410 in this position and quill 288 is retracted preparatory to a tool feeding advancement. Thus, it is clear that as quill 288 is advanced, the tool (not shown) will cut into the material (not shown) and pin 414 will advance in a counterclockwise direction as viewed from FIGURE 2. When pin 414 reaches the end of groove 416 and abuts surface 419, further tool feeding advancement is prevented. Thus, it is clear that the tool has cut into the work by a depth corresponding to the value of the graduation on scale 420 at which index 422 was originally set.

With continued reference to FIGURES 3 and 4, quill 288 extends upwardly through the cavities formed in housing 170 and is guided for reciprocal movement by internal surfaces on housing halves 172 and 174 in a manner described in detail in the aforesaid copending application Serial No. 149,002. The upper end of spindle 284 extends upwardly and interfittingly projects into a spindle drive sleeve 424 as best shown in FIGURE 4 and 7.

With continued reference to FIGURE 7, drive sleeve 424 is formed with a pair of internal dimetrically opposed spindle engaging splines 426 (FIGURES 8) extending radially inwardly adjacent the lower end of the drive sleeve. The bore 427 of drive sleeve 424 is relieved above splines 426 for a purpose as will presently appear. Splines 426 are matingly received in diametrically opposed uninterrupted grooves 428 (FIGURE 4) formed in spindle 284 to establish a drive connection between sleeve 424 and spindle 284 so that the spindle and drive sleeve rotate as a unit. Grooves 428 extend upwardly to the outer pulley end of spindle 284 from a position located normally below sleeve 424.

As best shown in FIGURES 3 and 4, drive sleeve 424 is journalled on longitudinally spaced apart sleeve bearings 430 and 432 which are preferably made of bronze. Sleeve bearing 430 is seated on mating semi-annular radially extending shoulders 433 formed in socket portion 236. Similarly, sleeve bearing 432 is seated on mating semi-annular radially extending shoulders 434.

Sleeve bearings 430 and 432 are securely clamped in place by bolt and nut assemblies 256 and 258.

The lower end of drive sleeve 424 is formed with a radially outwardly extending flange portion 436 engaging with a thrust washer 438 which is in clamped bearing relation to the downwardly facing edge of bearing 430 and internal surfaces defined by housing 170.

As shown in FIGURE 4, drive sleeve 424 extends upwardly and is formed with an upper end portion 440 of reduced external diameter. Extending radially outwardly from end portion 440 (FIGURE 7) are diametrically opposed splines 442 (FIGURE 8) received in mating diametrically opposed grooves formed in a hub portion 444 of a stepped spindle pulley 446 (FIGURE 4) to provide a drive connection therebetween. Hub portion 444 is seated on annular shoulder 445 formed on drive sleeve 424.

Drive sleeve 424 is axially retained in place by means of a split retainer ring 448 seated in a groove formed in the periphery of drive sleeve 424 axially outwardly of splines 442. Ring 448 abuttingly engages the top face of pulley 446.

Thus, by the engagement of ring 448 and flange portion 436 with their respective component parts, drive sleeve 424 is axially retained in the position shown.

Pulley 446 is of the stepped-cone multi-groove type and is described in detail in the aforesaid copending application Serial No. 149,002.

With quill and spindle operating mechanism thus far described, it will be appreciated that quill 288, spindle 284 and chuck 286 may be removed as a unit through the bottom tool opening formed by housing halves 172 and 174 simply by axially withdrawing feed shaft 340 in the manner previously described to disengage pinion 342 from rack 300. With pinion 342 disengaged from rack 300, spindle is freely slidable out of drive sleeve 426 thus allowing the easy and rapid removal of the quill and spindle assembly to enable the replenishment of lubricant in wells 312 and 314 or to facilitate replacement of parts.

A multi-grooved endless motor belt 462 extends around spindle pulley 446 and around a motor pulley 464 of the stepped-cone multi-grooved type as described in detail in the aforesaid copending application Serial No. 149,002. Pulley 464 is mounted on shaft 56 of motor 50 by means of a set screw 466.

As shown in FIGURES 3 and 4, motor 50 is pivotally mounted on an upstanding pivot rod 468 along a longitudinal axis extending parallel to the rotational spindle axis and the axis of support column 160. Details of the mounting of motor 50 is described in the aforesaid copending application Serial No. 149,002, to which reference is made in the event further description is needed. The upper end of housing 170 is closed by a one-piece cover guard 502 which is described in detail in the aforesaid copending application Serial No. 149,002.

A locking lever 524 is manipulatable to lock quill 288 in a selected position as also described in detail in said copending application Serial No. 149,002. Circulation of air for removing heat produced by operation of the drill press is also described in detail in copending application Serial No. 149,002.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drill press having a housing structure mounting a quill and spindle assembly and a quill feed mechanism for advancing and retracting the quill and spindle assembly, said quill feed mechanism comprising opposed housing wall formations respectively forming (a) a return spring recess in one outer housing wall formation elongated in a direction axially of said recess and provided with an end wall having a journal bore therein, said recess having diametrically opposed, axially directed groove formations in its wall, and (b) a second axially aligned shaft journal bore; a generally cylindrical hollow spring casing having diametrically opposed tongue formations in its outer wall and a coaxially apertured wall at one end slidably but non-rotatably supported in said return spring recess, a shaft member having respective reduced diameter ends disposed with its major diameter section in said end wall journal bore with one shaft end extending through and beyond said spring casing end wall and having a substantially coextensive diametrical slot therethrough, said spring casing end wall abuttingly engaging the shoulder formed at the inner end of said one shaft end with said cylindrical spring housing wall extending toward the outer end of said one shaft end; a clock spring disposed in said spring casing with its outer end fixed to said cylindrical spring housing wall and its inner end received in the diametrical slot of said one shaft end; a retainer ring fixedly mounted on the free end of said one shaft end; a quill feed pinion operatively engaging gear teeth means on the quill of said quill and spindle assembly and being fixedly mounted on the opposite end of the major diameter section of said shaft member, said major diameter section being of sufficient length between said shoulder at the inner end of said one shaft end and the opposing feed pinion end face to assure said spring casing being located at the outer end of said return spring recess when said feed pinion end face is butted against the end wall of said spring recess; a second shaft member fixed rigid with said other reduced diameter shaft end and extending through and beyond said second shaft journal bore; a biasing spring surrounding said second shaft member and cooperating with said feed pinion and said second wall formation to normally bias said shafts in a direction to abut said feed pinion with said end wall of said return spring recess; and means on the protruding end of said second shaft member adapted to be grasped by an operator to effect a manual feed movement of said quill in opposition to the action of the return spring or to shift the feed mechanism including the return spring casing axially thereby disengaging the feed pinion from the quill and conditioning the feed mechanism shaft members for independent unitary rotation to wind the spring and establish a desired spring return force in said return spring.

2. The drill press defined in claim 1 wherein said second shaft member has a shank portion extending through and beyond a wall of the quill support housing and wherein a depth-of-cut gauge is provided for, said depth-of-cut gauge comprising stop means disposed on said wall; a stop collar normally relatively rotatably supported by said shank portion and having stop means thereon disposed for rotatable movement therewith in a path intersecting said wall stop means; and means for selectively fixing said stop collar to said shank portion in a selected relative angular position of said second shaft member to establish a desired arcuate spacing between the wall stop means and the stop means on said collar.

3. The combination of claim 2 wherein said stop means on the housing wall comprises an arcuate groove coaxially related to said second shaft member axis having an angular length less than 360° and the cooperating stop means on said collar comprises a pin fixed to said collar and extending therefrom into said arcuate groove.

4. The combination of claim 2 wherein said collar comprises a split ring and said means for selectively fixing said collar to said shank portion comprises a clamp screw having a shank freely passing through a bore formed in one end of said collar and threaded into an axially aligned tapped bore in the other end of said collar and a stop shoulder engageable with said one collar end upon threading said shank into said tapped bore to contract said collar into clamping engagement around said feed shaft shank portion.

5. The combination of claim 2 wherein the housing wall extends in radial outward relation to an arcuate path extending from the zero stop position to the maximum stroke stop position determined by the wall stop means, said housing wall being provided with scale indicia graduated to correspond to linear feed movement of the quill and wherein the stop collar is provided with a reference mark adapted to be selectively set in any relative angular position of said feed shaft to cooperate with said scale indicia to indicate any available selected depth of cut from said relative angular position of said feed shaft whereby a setting of the drill press quill to a desired depth of cut can be made by advancing the drill into contact with a workpiece and rotating the stop collar relative to the feed shaft to a direct reading of the desired depth of cut.

References Cited by the Examiner
FOREIGN PATENTS 3,779    1914    Great Britain.

WILLIAM W. DYER, Jr., *Primary Examiner.*

FRANCIS S. HUSAR, *Examiner.*